Dec. 30, 1969     W. W. BOYNTON     3,486,315
SYSTEM FOR RECOVERY OF COTTON AND LIKE PLANT PRODUCTS
Filed Sept. 17, 1965     3 Sheets-Sheet 1
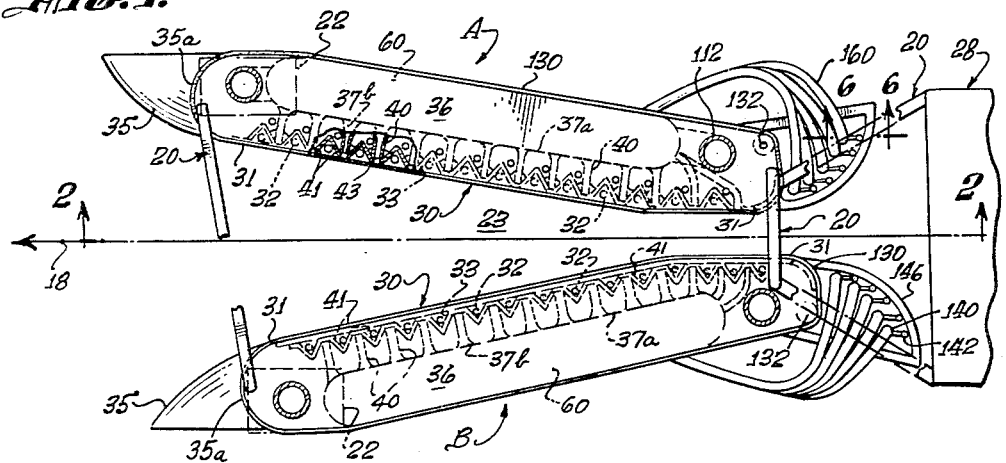
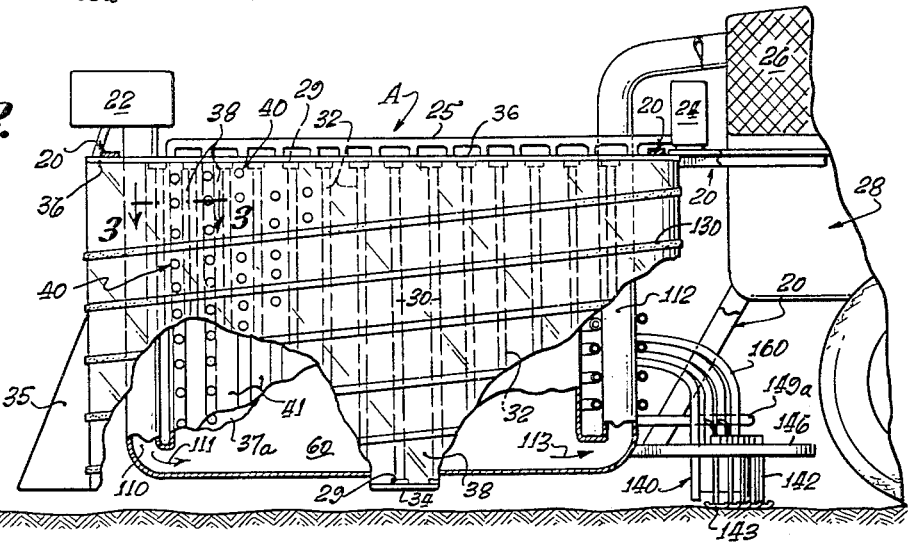
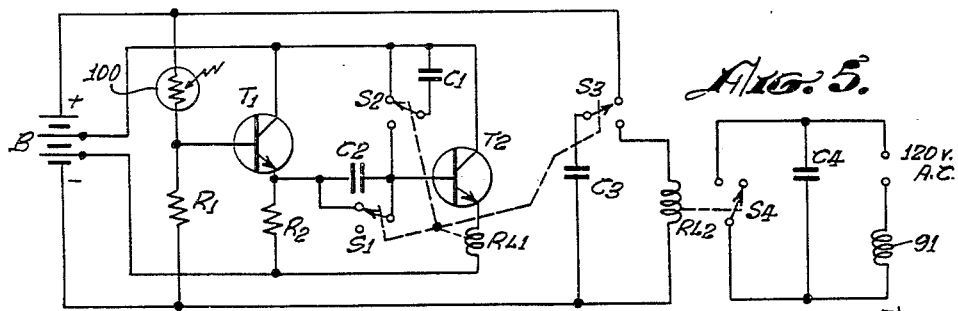
INVENTOR.
WILLIAM W. BOYNTON,
By Barlow & Lewis

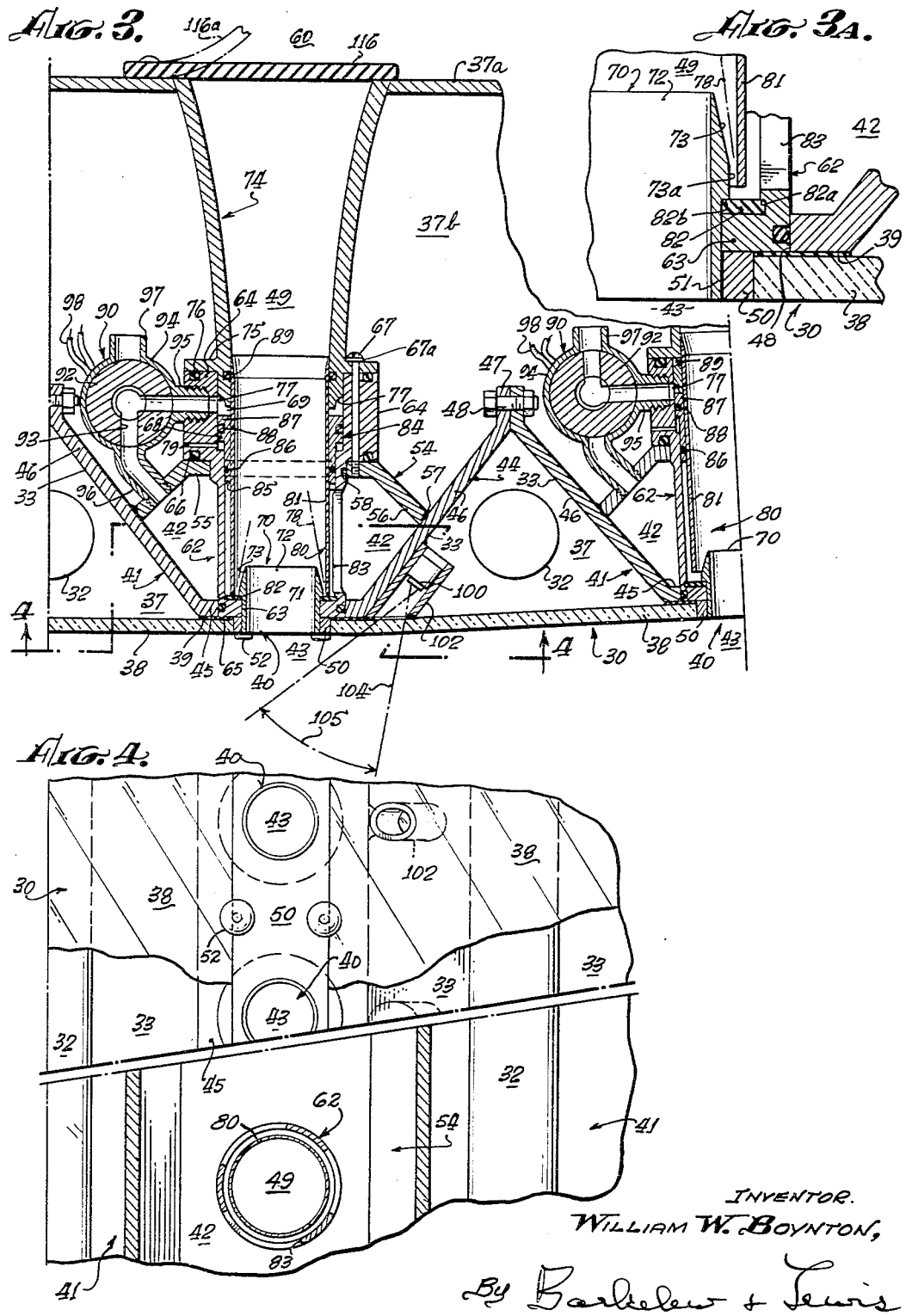

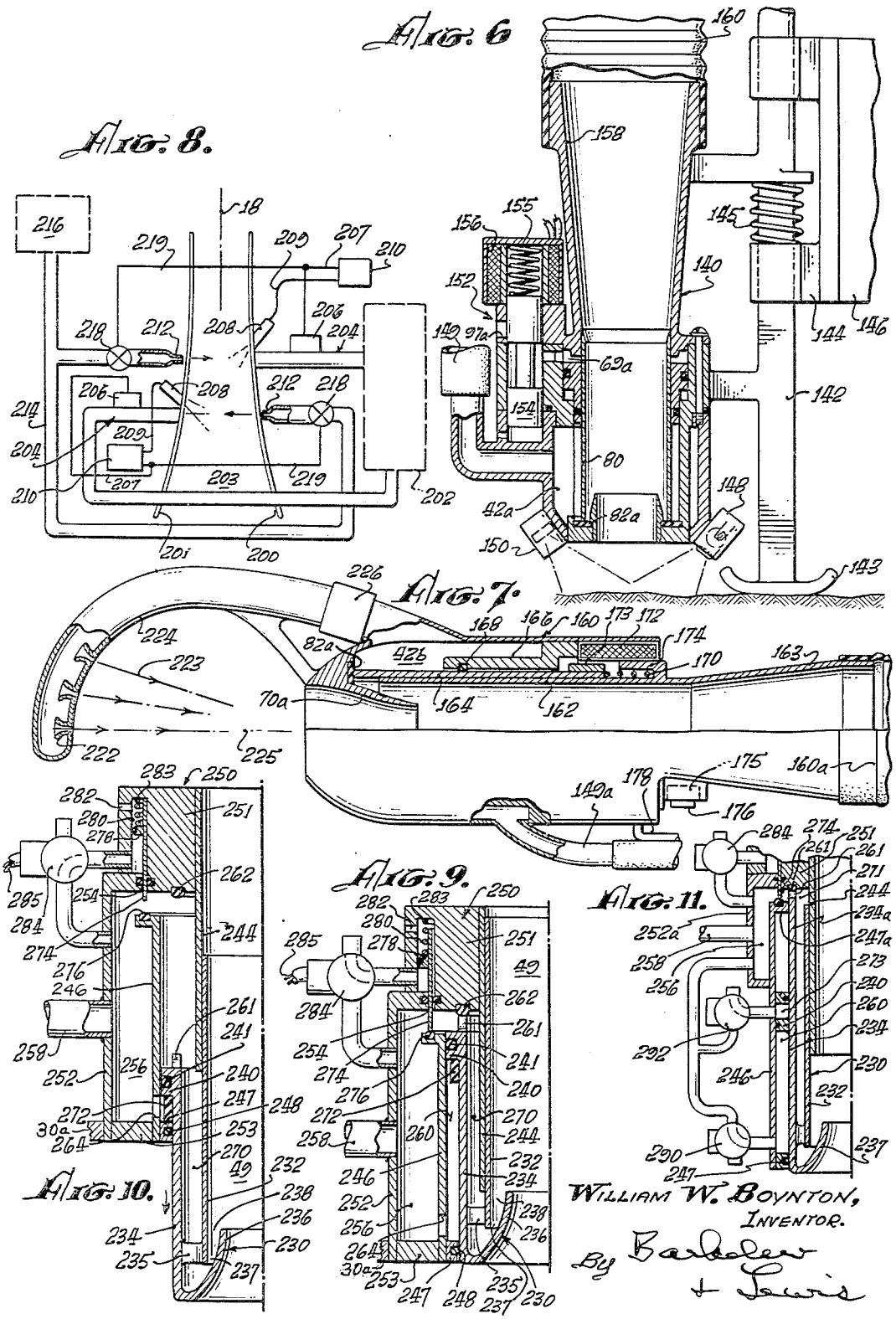

United States Patent Office 3,486,315
Patented Dec. 30, 1969

3,486,315
SYSTEM FOR RECOVERY OF COTTON AND LIKE PLANT PRODUCTS
William W. Boynton, La Canada, Calif., assignor, by direct and mesne assignments, to William W. Boynton and Leland McCarthy
Filed Sept. 17, 1965, Ser. No. 488,198
Int. Cl. A01d 45/20
U.S. Cl. 56—30                                    33 Claims

ABSTRACT OF THE DISCLOSURE

Plant products, especially cotton, are recovered by drawing them into suction tubes in which suction flow is produced by injecting inwardly directed air into the tube passage. Such suction flow is increased by many structural features, including control by a sleeve valve surrounding the passage and acting close to the injector nozzle, an accumulator immediately upstream of the valve, expansion form of the nozzle where it enters the passage, and progressively increasing passage diameter at its delivery end. Efficiency of operation is increased by limiting suction flow to periods when the plant product is actually detected near the passage inlet, limiting each flow pulse to a definite maximum duration, and providing a dwell or rest period of definite duration between pulses. Particularly effective structure and mounting arrangements are described.

---

This invention has to do with systems and methods for recovering plant products, whether gathered directly from the plants on which they have grown, from entanglement with their vines, trees or shrubs, or from the ground or other surface where they may have dropped naturally or as a result of picking or other operations.

This invention relates especially to improvements and further inventions relative to the recovery systems set out in the applications of the present applicant together with James R. Campbell, filed May 7, 1964, Ser. No. 365,731 now abandoned in favor of the continuation-in-part application, Ser. No. 641,091, filed Apr. 28, 1967, and now Patent 3,410,066 and with the said Campbell, and Carrol R. Nisewanger, filed Oct. 22, 1964, Ser. No. 405,769, now Patent 3,421,301. As in the first of said previous applications, the present invention typically utilizes individual control of suction application to each of a plurality of suction recovery tubes, which may be axially projectible or may be stationary; and, as in the second of said previous applications, each suction tube preferably leads directly and without obstructions from its product intake end to its discharge end into a relatively large receiver or conduit where the slowly moving air slows down the rapidly moving product without injury of any sort.

Among the characteristics of the present invention are the nature and preferably the location of the means for inducing inward suction flow. At or close to the outer receiving end of each suction tube is provided a controlled pressure injector that, by injector action, sets up the inward flowing suction that draws in the product and delivers it into the relatively large receiver. In addition to enhanced speed of operation and "reach" of effective picking, that method of producing suction flow has the great advantage of requiring no selectively operable valve or other obstruction at any point in the delivery passage. The controlling valve has its closure seat immediately adjacent the injector nozzle, where valve opening creates practically instantaneous inward suction flow without the time delay inherent in pressure-filling any conduit leading to the injector nozzle. In general, the present system has the further advantage of requiring only a fluid pressure producing apparatus such as a conventional air compressor, in addition to the electrical power production necessary for suction tube control. It also has further advantages, as will be set out.

Another feature of the present invention lies in the absence of any isolated protuberances on or projecting from the inner plant contacting surface of a plant contacting wall. In its preferred form, utilizing a slick surfaced wall member of e.g. glass, no protuberances, including the suction tubes, project normally, or at any time substantially beyond the plane of the plant contacting face of the glass wall.

A further aspect of the invention provides especially convenient and economical valve structures for controlling the production of suction flow by air injection into the picking tubes. The invention further provides improved means for mounting a plurality of picking tubes in closely spaced relation and for illuminating the vicinity of the picking tube inlets to insure effective control of the individual tubes by photoresponsive means.

The production of suction flow by injector action is particularly well adapted for gathering plant products from the ground or other surface, and the invention includes illustrative means for that purpose. The technique is further useful for hand gathering of plant products, either with completely manual control or with semi-automatic control whereby the intake end of the suction tube is manually brought to the plant product and the suction flow is then produced automatically in response to presence of the product.

The invention further provides means external of the picking tubes for selectively producing flow of the ambient medium toward and into them, preferably supplementing the suction flow resulting, for example, either from direct vacuum means, as in the copending applications identified above, or from injector action within the tubes. Such external means typically comprise nozzle structures alined with the respective picking tubes and selectively actuated to produce a free air jet directed toward the product receiving end of the tube in response to presence of a plant product in the vicinity. In a preferred arrangement of such jet nozzles, the plants are progressively compressed between two oblique smooth surfaces. Picking tubes are mounted in one wall, or in both walls of the tunnel in staggered relation, with the air nozzle for each tube opening coaxially through the opposite wall.

In the following illustrative descriptions reference is had to such a product as cotton, but it will be understood that the invention applies to the recovery of any product capable of being handled by apparatus of the general illustrative type, or in the illustrative manners, here described. With that illustrative use in mind, it may be noted that the apparatus of the present invention, and its mode of operation, have been designed particularly for cotton recovery.

In the following description the term "boll" refers to the unit of three to five pods tied to a common center and each containing a lock of cotton. When the pods open up as petals, the cotton locks open up into a ball and are preferably picked as a single unit. On the other hand, the invention is also useful for gathering smaller units, and even fragments of a lock. That is especially true in recovering cotton from the ground. After completion of the normal picking operation the remaining stubble is sometimes broken up into small pieces and spread on the ground as mulch. The present invention is further useful in recovering fragments of cotton from such stubble, typically as it is transferred by a conveyor belt from the comminutor to the distributor.

Other characteristics of the present invention will become apparent from the following descriptions of preferred embodiments, reference being had to the accompanying schematic drawings, in which:

FIG. 1 is a schematic plan of a recovery apparatus adapted particularly for cotton;

FIG. 2 is a schematic vertical longitudinal section with portions broken away, taken as indicated by the line 2—2 on FIG. 1;

FIG. 3 is an enlarged horizontal section on line 3—3 of FIG. 2;

FIG. 3A is a further enlarged detail of a portion of FIG. 3, showing the suction tube valve open;

FIG. 4 is an elevation partly broken away to the line 4—4 of FIG. 3;

FIG. 5 is a schematic diagram of an electrical control circuit;

FIG. 6 is an enlarged vertical section on line 6—6 of FIG. 1;

FIG. 7 is an elevation, partly in axial section, of a recovery apparatus for manual operation;

FIG. 8 is a schematic plan illustrating a further aspect of the invention;

FIG. 9 is an axial section corresponding generally to FIG. 3 and representing a modification;

FIG. 10 shows the system in FIG. 9 in operation; and

FIG. 11 represents a further modification.

FIGS. 1 and 2 illustrate schematically a conveyance 28 adapted to be propelled, by mechanism not explicitly shown, in the direction indicated along and over a row of plants, typically cotton, on the center line 18. Conveyance 28 is typically a tractor of the general type that carries the picking assembly of a conventional cotton picking machine. The two picking units A and B are essentially duplicates and are structurally held together and mounted on conveyance 28 by framing shown schematically at 20. The two units are mutually opposed in oblique relation and form a converging tunnel 23 in which the plants are compressed laterally as the machine advances. A gaseous or air blower is indicated schematically at 22 in FIGS. 1 and 2. A high pressure gaseous or air compressor is indicated at 24 with delivery line 25; and a final collector, usually a wire-mesh box, is indicated at 26 in FIG. 2.

Inwardly facing and converging walls 30 on the respective units A and B are indicated in FIGS. 1 and 2 as extending longitudinally between the points marked 31, although their ends may extend further around the structural metal curves 35a beyond. Those walls extend in vertical height between a lower horizontal plate 34 in FIG. 2 and an upper plate 36 and enclose, with those plates and with a back wall, a dust-tight chamber indicated at 37b. The back wall of chamber 37b is typically formed largely by the front wall 37a of receiving chamber 60, to be described. Converging walls 30 are typically formed of vertical frame elements or columns 41 with elongated windows 38 between them of plate glass or other material that is transparent or highly translucent in the desired region of the spectrum. The windows are mounted in flush relation to the column members, producing an essentially continuous smooth wall surface free of any protrusions that might impede passage of the plants through the trough.

Suction tubes 40 for recovering the plant product are mounted in vertically spaced relation along each column 41, together with means (omitted in FIGS. 1 and 2) for supplying fluid pressure under valved control to the tubes for intermittently actuating them. The product receiving mouths 43 of the suction tubes open through respective bores in the wall columns 41, and the actuation of each tube is typically controlled by a photocell that is beamed at the region of tunnel 23 immediately adjacent the tube mouth. The photocells are not shown in FIGS. 1 and 2, reference being made to their description and operation in connection with FIG. 3 and following figures.

The plant material in tunnel 23 is illuminated by suitable light sources 32 mounted behind the respective windows 38. Thus the illuminants may be located in chambers 37 inside the enclosed bodies of A and B, which are sealed tightly to exclude dust. Light sources 32 are shown typically as fluorescent gaseous discharge tubes, which are available with a wide variety of emission spectra. Such illuminants are preferably backed by suitable reflectors, indicated schematically at 33. A preferred form of such reflectors will be described. The close proximity of the illuminant to the plant structures and the large working areas of the windows permit brilliant and uniform illumination to be supplied to the desired regions without interfering with the picking structures or free movement of the plant material through tunnel 23.

Each suction tube 40 is mounted with its outer receiving end or mouth 43 substantially flush with the inner plant contacting surface of the wall 30, and with its inner end delivering into the relatively large receivers 60. A single receiver 60 may serve all tubes of each unit A and B. The gathered cotton is removed from receivers 60 into the accumulation basket 26 by some suitable conveyor means, one type of which utilizes an airstream from blower 22.

From FIG. 2 it will be noted that several suction tubes 40 are associated in vertical spacing with each column 41, thus forming a two-dimensional array, and that the tubes associated as shown here with the vertical columns 41 are staggered progressively upward toward the rear of tunnel 23, so that the effective vertical spacing between vertically adjacent tubes for the entire assembly becomes a small fraction of the vertical tube spacing in each column. Furthermore, the two similar units A and B are, in the complete apparatus, offset in the direction of travel and of the cotton row by an amount approximately equal to one-half the longitudinal distance between adjacent tube columns. That means, particularly at the smaller tunnel width near its rearward end, that any remaining cotton lock is almost certain to be picked off by a tube associated with one or another unit A or B. The smallest width to which the cotton plants are compressed in the tunnel is typically of the order of three or four inches. The widest width at the forward end of the tunnel is preferably 20 to 30 inches, or somewhat less than the average spacing of the cotton rows, which is normally 39 inches. The metal body curves at 35 and 35a are intended merely to gather in any sporadically projecting plant part wider than that.

As shown in FIGS. 3 and 4, each column 41 comprises an assembly of two column members 44 and 54, both of oblique channel section. Main column members 44 are mounted with their web portions 45 parallel, defining supports for the walls 30 of the plant receiving tunnel 23. The flanges 46 of those members extend rearwardly from wall 30 at an oblique angle, typically 45°, enclosing the vertically elongated chambers 37. The flange edge portions 47 of adjacent columns are bent to lie in a common plane approximately perpendicular to wall 30 and are rigidly connected together as by the bolts 48. The row of columns 41 thus forms a rigid frame assembly. Auxiliary column members 54 have web portions 55 in parallel spaced relation to webs 45 of the main channel members, and have oblique flanges 56 that abut the flanges of the main column members at 57 and are rigidly secured to them in fluid tight relation, as by welding. The two column members thus form an elongated rigid structure enclosing a vertical chamber 42 with parallel opposed front and rear walls 45 and 55, respectively. Chambers 42 are closed at their lower and upper ends by end plates 34 and 36 (FIGS. 1 and 2), to which the column members are joined in fluid tight relation. Chambers 42 are utilized as headers for distributing pressurized fluid, typically compressed air received from compressor 24 via line 25, to the several suction tubes 40 mounted on each column.

The windows 38 are mounted against the outer faces of webs 45 of the main channel members, with gaskets 39 of sponge rubber or similar material to produce dust-tight seals all the way around them. Mutually adjacent windows are spaced apart by the flush spacer strips 50, mounted on the column webs. The windows may be held in position in any suitable manner, as by the screws indicated at 52, which have large and very flat heads, forming no appreciable protuberance beyond the smooth wall face 30.

The lamps 32 are mounted by means of conventional fittings 29 behind the respective windows 38 and in the angles formed by the outer faces of main column flanges 46. Those faces are given a highly reflective surface, as by coating them with white enamel or, if a specular reflective surface is desired, by chrome plating and polishing, for example. The resulting reflective backing for the lamps greatly increases their efficiency, while requiring a minimum of equipment. The lamps and the reflectors are fully protected from dust within the sealed enclosures 37 formed by columns 41, windows 38 and lower and upper plates 34 and 36.

Each suction tube 40 of the present embodiment is constructed as a subassembly that is releasably mounted on column 41 in a pair of alined defining bores 53 and 58 in the respective channel webs 45 and 55. Each suction tube comprises the cage body 62 of generally cylindrical form, the picking nozzle 70 at the forward or product receiving end of the cage body, the delivery tube 74 at the rearward or delivery end of the picking passage 49, and the sleeve valve 80 which also forms the inner wall of that passage for an appreciable portion of its length.

The forward end of cage body 62 fits directly in mounting bore 53 in forward channel web 45 and is sealed by the O-ring 65. An external flange 64 at the rearward end of the cage body seats axially against the rearward face of column web 55 and is sealed by the O-ring 66. Within rear flange 64, the cage body is counterbored at 68 to receive telescopically the forward end of delivery tube 74. That tube is positioned by the external flange 75 and sealed by the O-ring 76. Delivery tube 74 and cage body 62 are releasably secured to the column by the screws 67 with sealing washers 67a. The rearward portion of delivery tube 74 increases gradually in diameter and preferably opens directly into receiver 60. Expansion of the suction flow in delivery tube 74 initiates the velocity reduction that is provided by the large receiver chamber 60. The expansion portion of the tube may be considered as a part of that chamber. The portion of counterbore 68 forward of delivery tube 74 forms the annular valve actuating chamber 69. The forward end of that chamber is preferably vented to atmospheric pressure, as at 79.

Cage body 62 is internally flanged at 63 at its forward end. The rearward axial face of that flange supports the annular valve seat 82, comprising a washer-like body of suitable material such as neoprene typically between 70 and 80 shore. The valve seat is retained at its outer edge by a radial channel 82a in the cage body and at its inner edge by a shallow offset 82b of the outer surface of picking nozzle 70 (see FIG. 3A). That nozzle is typically secured within cage body flange 63 by a press fit. The forward portion of nozzle 70 is received in a clearance bore 51 in window spacer 50, and its end is flush with wall surface 30.

Valve sleeve 80 is mounted within cage body 62 for axial sliding movement between a closed position engaging valve seat 82, as in the left hand suction tube of FIG. 3, and an open position spaced from the valve seat, as in the right hand suction tube of FIG. 3 and in FIG. 3A. Valve sleeve 80 comprises the tubular portion 81 and the annular differential piston structure 84, joined essentially integrally as by silver soldering. Piston structure 84 comprises the forward annular piston 85 that slides within the main cylindrical bore of cage body 62 with sealing means 86, and the rearward annular piston 87 of larger outer diameter than 85 and sliding within the counterbore 68 of the cage body with sealing means 88. Tubular portion 81 of the valve sleeve projects to the rear of the piston structure and slides telescopically within the forward portion of delivery tube 74, sealed by the O-ring 89. Forward of the piston structure, tube 81 is spaced radially inward of the cage body, and its extreme forward end engages valve seat 82 to form the valve proper. Pressurized fluid from the interior of header chamber 42 is freely admitted to the exterior face of valve sleeve 80 adjacent the valve by the slots 83, which are distributed circumferentially of the cage body and extend essentially between forward flange 63 and the portion of the cage in which piston 85 works. That fluid exerts continuous yielding pressure upon the forward face of piston 85, tending to open the valve.

Pilot valve 90 may be of any suitable type that causes piston chamber 69 to be connected normally to a source of pressurized fluid, and to be cut off from that source in response to an electrical signal and connected instead to a relatively low pressure such as atmospheric pressure. As illustratively shown, valve 90 comprises the valve body 92 rotatably mounted in the valve housing 94 and having the angular valve passage 93. The valve body is driven through 90° in a counterclockwise direction as seen in FIG. 3, from the normal position shown at the left of FIG. 3 to the operated position shown at the right, by a conventional rotary solenoid with winding 91 (FIG. 5), and is returned to normal position by a suitable spring, not explicitly shown. The valve is connected to piston chamber 69 via the nipple 95, to header chamber 42 via the conduit 96, and to atmospheric pressure via the orifice at 97. In normal position of the valve, as shown in the left hand unit of FIG. 3, pressure from the header is admitted to piston chamber 69, exerting on the rearward piston 87 a force that exceeds the opposing force on the smaller piston 85, driving valve sleeve 80 firmly downward as seen in FIG. 3 to seat the main valve at 82. When a suitable electrical voltage is supplied to pilot valve 90 via the electrical connections indicated at 98, the valve body is rotated to the position of the right hand unit in FIG. 3. Piston chamber 69 is thereby essentially immediately reduced to atmospheric pressure, permitting the continuing force on piston 85 to open the main valve. That opening movement is positively limited by impact of the piston structure against the forward end of delivery tube 74. That contact, however, leaves exposed a piston area larger than that of piston 85. Valve closure in response to termination of the electrical voltage is further aided by the curved section of the delivery tube end at 77.

Picking nozzle 70 includes a rearwardly projecting part 72 with an outer conical surface 73 projecting in radially spaced relation into the forward end of valve sleeve 81 in both open and closed positions of the valve. That surface and the inner surface of tube 81 form a generally annular but flaring mouth that opens obliquely into the main suction tube passage 49 adjacent its side wall and in a rearward and radially inward direction. That mouth defines an annular pressure injector stream which may be considered to have an "axis" that is a conical surface indicated schematically at 78. The conical surface 73 preferably does not extend all the way to valve seat 82, but terminates forwardly in a right cylindrical surface 73a that is spacedly opposed in parallel relation to the inner wall of valve tube 81 in both open and closed positions of the valve, forming a flow limiting throat the width of which is independent of the exact valve travel. Thus any slight inaccuracy or wear of the valve seat or the stop limiting the valve movement does not significantly affect the injector action.

On opening of the valve from seat 82, a strong jet of pressurized fluid from header chamber 42 enters passage 49. That jet is of generally annular form, and flows along the cylindrical passage wall but with an appreciable radial component toward the passage axis, due to the oblique axis 78 of the nozzle. The jet produces powerful injector action, driving the air in passage 49 rearwardly and drawing air inward through mouth 43 into the forward end of the passage. A plant product in the vicinity of mouth 43 is drawn in with the airstream at a high velocity. That velocity is reduced to a moderate value by expansion of the airstream in the flaring section of delivery tube 74, and the product is delivered to chamber 60 in which the air is relatively static. The width of that chamber is seen from FIG. 1 to exceed the length of the picking tubes 40, and the produce is there further reduced in velocity and essentially brought to rest without encountering any obstacle that could cause injury to the product or interfere with normal operation of the system.

Pressure carried in the header chamber 42 has been found to be efficiently about 60 p.s.i.g. The injector action within passage 49 may be produced by a wide variety of nozzle structures. However, a nozzle of generally annular form has the advantage of leaving the entire axial portion of the passage free of obstruction. The present nozzle structure, with an uninterrupted annular orifice leading into passage 49 at a small oblique angle, has been found highly advantageous. Notably superior performance has been obtained with the angle between conical surface 73 and the cylindrical passage wall between about 10 and about 15 degrees, the preferred value being about 12½ degrees. The length of that conical section should be sufficient to produce appreciable expansion of the jet before it is emitted into the passage 49. That is, the cross section of the nozzle at its discharge end is preferably at least about two or three times larger than at its most restricted point or throat.

A further important feature of the present structure is that the control valve is located essentially at the throat of the nozzle, and that a relatively large volume of pressurized gas is maintained immediately adjacent the valve on the inlet side. That volume is provided in the present structure by header chamber 42, which communicates substantially directly with the valve at 82 through the ample slots 83 of cage body 62. The volume of pressurized gas thus having effectively direct access to the valve is preferably at least of the same order of magnitude as the effective volume of suction passage 49. The effective volume of passage 49 may be taken as the volume from the inlet end to the point at which the flare of delivery portion 74 becomes appreciable; an axial distance of only about five tube diameters in the preferred structure of FIG. 3. If the passage continues for a considerable distance at essentially uniform diameter, as in certain embodiments to be described, the effective volume may be taken as the volume of a section of the passage five to ten diameters long. In the present embodiment each suction tube may be considered to be served by a section of the header chamber of the same length as the vertical spacing of the tubes. However, in practice, since two adjacent tubes are not apt to be actuated at the same instant, the header cross section computed on that basis is more generous than necessary.

With a pressurized chamber of the type described directly accessible to each control valve, abrupt opening of the valve immediately produces a jet stream corresponding to essentially the full available pressure, and the character of the jet can be maintained substantially undiminished at least long enough to build up the maximum rate of suction flow throughout the mouth region of passage 49. The larger the available header volume, the longer that flow can be maintained without the effective pressure becoming dependent upon the size of the supply line to the header.

The photocells 100 for controlling the respective suction tubes 40 are mounted in suitable housings 102 behind the windows 38, and are directed through those windows at the portions of tunnel 23 immediately in front of the respective suction tubes. The housings 102, aided by lenses if desired, limit the input light to the photocells to a conical region such as is indicated at 104. Additional baffles may be provided as needed to prevent stray light from reaching the photocells from sources other than bodies within tunnel 23. A particular advantage of the present illuminating system is that, as "seen" by each photocell, the plant material in tunnel 23 receives front lighting from the immediately adjacent lamp 32 and receives side lighting from the lamp on the other side of the suction tube column 41. That combination of lighting qualities is particularly effective for obtaining reliable photocell response to all cotton locks within the effective field of view of the photocell, that is, within the cone 104 and not farther from the photocell than a limiting range such as is indicated by the arc 105 such that a typical cotton lock or group of locks subtends a large enough solid angle to energize the cell.

The color of the light emitted by lamps 32 and the spectral sensitivity of the photocells are chosen with regard to the particular plant product to be gathered so that the cells are selectively responsive to the desired product in preference to other plant material. For example, in the case of cotton, that may be accomplished effectively by utilizing primarily the blue portion of the visible spectrum.

Each photocell 100 is typically a photoresistive device such as cadmium sulfide, controlling the solenoid pilot valve 90 via a circuit of any suitable type. A separate amplifying and control circuit may be provided for each suction tube and its photocell, or a portion or the whole of such circuitry may be shared among a plurality of suction tubes, as by conventional multiplexing techniques. The individual circuit shown schematically in FIG. 5 provides time control of two distinct types: to limit the period of injector action in the suction tube, and to interpose a rest period between successive injector actions. With relay RL1 idle and its three switches S1, S2 and S3 in normal positions, as shown, the transistors T1 and T2 form a conventional amplifier responsive to changes in the conductivity of photoresistive cell 100. With illumination of photocell 100 below a definite threshold value both transistors are cut off. With illumination above that threshold, as in presence of a cotton lock within the effective field of view of the photocell, the transistors conduct, energizing RL1. The resulting shift of S1 applies capacitance C3, already charged to the full voltage of battery B, across the winding of relay RL2, closing its switch S4. The solenoid winding 91 of pilot valve 90 is thereby energized, initiating a cycle of operation of the associated suction tube. The value of C3 and the winding of RL2 are so selected that operation of RL2 is maintained for a predetermined time period, typically about 40 milliseconds. Upon release of RL2, pilot valve 90 is returned to idle condition, terminating the injector action in the suction tube.

Following each such picking cycle, the system is disabled during a predetermined recovery or rest period. That is accomplished in the present system by relay switches S1 and S2. At initial energization of RL1, switch S1 opens the direct connection from the output circuit of T1 to the base of T2, and switch S2 connects that base to C1, thereby setting the base at a voltage that is adjustable by selection of C1 and C2 and that is designed to maintain conduction in T2. Base current in the transistor progressively charges C1 until, after a definite disabled time period, the emitter current in T2 drops below the threshold needed to hold relay RL1, idling that relay. The circuit is thereby returned to operative condition ready for another cycle. The disabled time is preferably of the order of half again as long as the duration of each period of operation of RL2. For example, if the dwell time of pilot valve 90 in actuated condition is 40 milliseconds, the total disabled time is typically approximately 60 milliseconds, leaving 20 milliseconds of rest time between successive cycles of operation. During that rest time the system returns to equilibrium, both electrically and pneumatically. The suction flow in passage 49 decays to a low velocity, permitting any pods or other plant parts that have become lodged against tthe passage mouth to drop free or be carried away by the relative movement of the plants. The passage is thereby cleared, and also heater chamber 20 or its equivalent is essentially fully recharged with pressurized gas, ready for the next cycle.

As already indicated, cotton picked by the several suction tubes 40 is immediately deposited in receiver chamber 60, the relatively large volume of which slows the cotton gently from its entering velocity and permits it to settle to the chamber floor. Delivery of the cotton from chamber 60 to the final collector 26 may be accomplished in many different ways, including, for example, a moving conveyor belt that passes along the floor of chamber 60 and empties into collector 26. A preferred mode of transfer, illustrated in FIG. 2, utilizes an air stream of low velocity compared to the velocity of the intermittent pulses in the suction tubes. A stream of air 111 from blower 22 is injected via the conduit 110 into chamber 60 parallel to its floor and directed toward the outlet conduit 112. The outlet airstream 113 is delivered into collector 26, either directly as indicated or via a further blower which augments the flow and is designed in known manner to handle an airstream laden with cotton locks. When an injected airstream such as 111 is employed for cotton transfer, chamber 60 is preferably closed at its top to permit a slightly superatmospheric pressure to build up within it, thereby strengthening the outward flow at 113.

It is then desirable to provide a check valve for each suction tube 40 to prevent outflow through that open tube during the periods between pulse actuation of the injector nozzles. Such check valves may, for example, comprise flapper valves of sheet rubber or similar material mounted at one edge and normally covering the delivery mouth of each tube 40 where it opens into chamber 60, as indicated at 116 in FIG. 3. Such valves prevent outward flow from 60 but offer essentially no resistance to inward flow, opening as indicated at 116a in response to each air pulse typically well in advance of the arrival of the plant product itself at the delivery end of the suction tube. The material of the valve is preferably flexible enough that the pulse velocity is scarcely affected. If preferred, check valve structures may be mounted further upstream of passages 49, for example at the smaller end of delivery tubes 74. Particularly in the latter case, the volumes within those flaring tubes may be considered as forming part of the receiving chambers 60.

When check valves 116 are provided on all of the suction tubes the intermittent actuation of those tubes tends to build up an appreciable superatmospheric pressure in chamber 60. The resulting air flow out of chamber 60 through outlet 112 (FIG. 2) greatly assists blower 22 in delivering cotton to final receiver 26 and may be entirely sufficient for that purpose. Blower 22 and inlet pipe 110 may then be omitted; or blower 22 may be shut down during normal picking operations and employed only when the rate of actuation of suction tubes 40 is insufficient to maintain an adequate delivery flow in pipe 112.

FIGS. 1 and 2 show a series of flat endless belts 130 which are driven to travel over the plant contacting face of wall 30 at substantially the velocity of progress of the conveyance and in the opposite direction, so that they remain substantially stationary relative to the ground and the plant row. They tend to prevent the plants from being dragged forward even by the slight frictional coefficient of the smooth walls. Due to their relative motion, those belts do not constitute a horizontal protuberance from the wall face, and there is no other protuberance from the working portion of the wall. Belts 130 are typical driven by means of pulleys fixed on the vertical driven shaft 132 (FIG. 1) and may be guided by shallow channels in the surfaces on which they run or by rollers distributed at suitable points along their length. The working portions of the belts on walls 30 preferably slope upward to the rear of tunnel 23. They then tend to lift the plants as the latter are compressed laterally between the two sections of the machine. The progressive vertical offset of the picking tubes 40 of successive columns, already described, can conveniently be coordinated with the belt slope, as indicated illustratively in FIG. 2.

The lowermost suction tubes 40 are close enough to the ground, and their receiving ends are close enough together, to gather any cotton locks that may have fallen to the ground close to the centerline of a row. The machine of FIGS. 1 and 2 further includes an array of suction tubes 140 mounted at the rear of the machine in position to recover cotton that has fallen to the ground between rows. Each tube is mounted on a vertical axis, preferably in a manner to be individually adjustable in accordance with variations of the actual ground level, thereby maintaining optimum effectiveness of action. Each tube assembly is mounted on a guide member 142 that is vertically slidable in the bracket 144 (FIG. 6). Brackets 144 are mounted in any convenient manner on the conveyance, as by the frame structure indicated at 146. The lower end of each guide member 142 carries a foot 143 designed to slide over the ground and support the guide and tube. A portion of the weight of that assembly may be taken by a spring, shown illustratively at 145. Support foot 143 and spring 145 may be considered representative of a wide variety of known mechanisms that may be employed for driving the vertical movement of an element to maintain a definite spacing between the element and a surface such as the ground. Pressurized fluid, typically air, is supplied to the suction tube pressure chamber 42a via the flexible hose 149 from the header pipe 149a on the conveyance. Chamber 42a serves only a single suction tube, but otherwise performs the same storage function that has been described for header chamber 42 in FIGS. 3 and 4. The delivery end of suction tube 140 is provided with an expansion section 158 which leads into a flexible delivery hose 160. That hose accommodates the vertical tube movement and leads typically into the same chamber 60 to which the main array of suction tubes deliver.

Each ground picking tube 140 typically carries its own light source and photocell, which may be mounted at opposite sides of the product receiving end of the tube as indicated schematically at 148 and 150 in FIG. 6. The internal structure of ground picking tubes 140 is typically similar to that of tubes 40, already described, and corresponding numerals are employed. However, a three-way pilot valve of translational type is shown at 152 in FIG. 6, with valve spool 154 normally pressed downward by the spring 155, as shown, and shiftable upward on energization of the solenoid 156. In the normal position of the pilot valve, pressure from chamber 42a is admitted to the upper piston chamber 69a, closing main valve 82a. In response to pilot valve actuation chamber 69a is opened to the atmosphere at 97a, and the main valve is opened by piston action, admitting pressurized fluid to the injector nozzle in the manner already described.

The present method of producing suction flow in a picking tube by injector action is particularly well adapted for use in a manually operated picking tube. Previously available manually operated suction picking devices have suffered from the severe disadvantage that the suction pulse at the picking head was greatly attenuated by the necessarily long hose connecting the picking head to the suction producing device. With the present injector system, the suction is produced directly at the picking head where it is needed. Not only is the full suction force available at the picking aperture, but fully effective suction can be produced and terminated during an extremely short picking interval, typically of the order of 10 to 100 milliseconds. The possibility of using such short suction pulses leads to great power economy both for manual operation and for fully automatic machine operation such as had been described.

A suction tube generally similar to that of FIG. 6 is suitable for manual operation. For that purpose, guide member 142 is replaced by a convenient handle structure to facilitate manually bringing the product receiving end of the suction tube adjacent any product to be gathered. Pressure hose 149 and delivery hose 160 are made long enough to permit the required freedom of movement for the particular type of picking to be done, and they typically lead to a vehicle that carries a power driven air compressor and a suitable container for the product delivered by hose 160. The vehicle also carries a source of electrical power and control circuitry which may be similar to that of FIG. 5. The two hoses can conveniently be clipped together at suitable intervals, together with electrical cables for operation of lamp 148, sensing device 150 and valve solenoid 156. With such modification of the device of FIG. 6, the operator brings the picking head manually to the product to be gathered. Valve actuation to produce suction by injector action is then controlled automatically in response to presence of the product. That mode of operation may be characterized as automatic manual.

If it is preferred to operate entirely manually, the apparatus can be further simplified by omission of the light source, the photocell and the equipment needed for their operation. An illustrative picking head for complete manual operation is represented in FIG. 7, which also illustrates structural modifications that may be utilized in machine-installed picking tubes as well as for hand operation. The main housing 160 contains the pressure chamber 42b, corresponding in function to chamber 42a of FIG. 6. Picking nozzle 70a is formed integrally with the housing, and valve seat 82a is retained in a groove between the nozzle section and the housing proper. The main part of the suction tube comprises a fixed sleeve 162, the rearward portion of which flares radially to form an expander section 163. That section delivers into a flexible hose 160a of any desired length. The pressure hose 149a supplies pressurized fluid to chamber 42b. The exterior of expander section 163 forms a convenient handle.

The valve sleeve 164 slidingly surrounds the forward portion of sleeve 162 and is further guided by the partition member 166 with suitable sealing means indicated at 168. The valve is normally closed by the spring 170. The valve may be selectively opened in any suitable manner, for example by a hand actuated trigger coupled mechanically to the valve sleeve to move it against the force of spring 170. In the present embodiment the valve is opened by energization of the solenoid 172 which attracts the annular armature 173 mounted on the valve sleeve. Any suitable means may be used to limit the valve opening movement of sleeve 162. For example, the housing flange 174 may form a positive stop for armature 173. Solenoid energization is manually controlled by a simple electrical switch, with push-button 176, connected in the line 178 between the solenoid and a power source, not shown. Electrical circuit means of conventional type may be provided, if desired, for causing the valve to remain open for a definite time period each time the switch is closed.

A further aspect of the invention is illustrated schematically in FIG. 8. The oblique, plant-compressing walls 200 and 201 define a tunnel 203 which corresponds generally to tunnel 23 defined by walls 30 in the embodiment of FIGS. 1 and 2. One or more suction tubes for gathering plant products in tunnel 203 are mounted with their receiving ends flush with the tunnel-forming walls in the manner already described. For illustration, two such tubes are indicated schematically at 204, one mounted in wall 200 and the other in wall 201, delivering to a chamber 202. Tubes 204 may be of any type that draws in the desired plant product with a stream of ambient air. Tubes 204 are preferably operated intermittently in response to presence of the plant product close to the intake mouth of the tube, and may then operate in the general manner already described in the present application or, for example, in any of the manners described in the above identified copending applications. Control devices for the respective tubes are indicated at 206 and will be understood to be of appropriate type for control of the suction tubes with which they are associated. The control devices 206 will be considered to be responsive to electrical signals received over the lines 207 from the respective control circuits indicated at 210, which are, in turn, responsive via the lines 209 to sensing means indicated at 208 for detecting the presence of a plant product in the vicinity of the receiving end of the suction tube. Sensing means 208 are typically photosensitive devices with suitable illuminating means, operating in the general manner described above and in the copending applications.

In accordance with the present aspect of the invention, a jet-forming nozzle is mounted externally and in front of each of the suction tubes 204, directed toward that tube substantially along its axis. Such nozzles can conveniently be mounted back of the opposite wall 200 or 201, delivering its jet through an orifice that is substantially flush with the front face of that wall and directly opposite the associated suction tube. When suction tubes are mounted in both walls 200 and 201, as is ordinarily preferred, they are arranged in staggered relation with a jet nozzle 221 in the opposite wall in alinement with each of them. Jet nozzles 212 are supplied with pressurized fluid, typically air, via the conduits 214 from a suitable source indicated schematically at 216. If suction tubes 204 are operated by pressure fluid, they may utilize a common source with nozzles 212, though it may be desirable to employ different pressures for the two types of operation. Individual remotely controllable valves 218 are preferably provided in the conduits to the respective nozzles. Those valves are typically operated by solenoids that are energized via the lines 219 from the same control circuits 210 that actuate tubes 204. It is usually satisfactory to operate each suction tube and its associated jet nozzle in exact unison, in which case they can be designed for operation in parallel by the same control signal, as indicated in the figure. Alternatively, separate control circuits may be provided, differing in electrical characteristics, time constants, or in any other desired respects. For example, control circuits 210 may include separate output circuits of the type shown in FIG. 5 for the suction tubes and for the jet nozzle, the time constant determined by C3 and RL2 being typically shorter for the jet than for the suction tube. Jet action is then concentrated at the start of the suction cycle, and terminates as soon as the plant product has been accelerated toward the suction intake.

With the system represented in FIG. 8, presence of a plant product at the intake mouth of one of the suction tubes 204 is detected by photocell 208, actuating both the suction tube and the alined jet nozzle 212. The resulting jet stream, directed toward the suction tube essentially along its axis, exerts a direct force on the plant product directed toward the tube mouth, tending to break the product loose from the plant or from any other encumbrance that might limit its movement, and to accelerate it toward the suction tube. Also, the alined jet from the nozzle increases appreciably the velocity and momentum of the fluid stream entering the suction tube. The jet not only makes abundant air available to be drawn in by the suction tube, but aids the intake movement by the concentrated and directly alined momentum of the jet stream.

An external jet-forming nozzle arrangement is shown also in illustrative form mounted on the manual device of FIG. 7. The tube 224 communicates with pressure chamber 42b and extends in an arc from housing 160. The solenoid valve 226 controls the flow in that tube from pressure chamber 42b, and may be connected in parallel with solenoid 172 for energization by switch button 176. The nozzle orifices 222 are formed in tube 224 near its end and are directed generally toward the product receiving mouth 43a of the main picking tube. In operation of such a picking device, it is generally sufficient to bring the cotton boll or other product to be gathered within the arc of tube 224. Depression of button 176 then simultaneously produces a plurality of air jets directed radially inward toward the inlet 43a of the main picking passage and produces suction flow into that passage. Presence of the jets 223 facilitates operation in the respects already described in connection with FIG. 8, and reduces the accuracy with which the device must be positioned with respect to the product to be gathered. While it is theoretically desirable for the array of jet orifices 222 to be fully symmetrical with respect to axis 225, considerable departure from that relation is acceptable in practice since the reduced length of tube 224 facilitates manipulation of the device. Solenoid valve 226 can, of course, be replaced by a mechanically operated valve with an operating lever in position to be conveniently reached by the operator. That lever may be independent of the mechanism for operating the injector valve at 82a, or both valves may be coupled mechanically by a suitable linkage for operation together by a single lever. On the other hand, the solenoid valves of FIG. 7 may be operated automatically in response to presence of the plant product within the region between tube 224 and the suction tube, for example by providing a light source and light responsive device in the general manner shown in FIG. 6. For some types of picking it may be preferable to employ the mechanism of FIG. 7 without the nozzle orifices 222, in which case the entire tube 224 may be detached and the opening in chamber 42b sealed by a suitable plug. In a system such as that represented in FIG. 8, jet nozzles may be mounted, if preferred, in tubes generally similar to tube 224 of FIG. 7, extending from walls 200 and 201 in a rearwardly oblique direction such that plants passing between the walls will slide freely over them.

The modified suction tube structure represented schematically in FIGS. 9 and 10 is adapted to project the product receiving end of the tube forward (downward as seen in the drawings) toward the product during the picking cycle, in a manner corresponding generally to that described in the first copending application referred to above. At least the forward portion of the suction passage 49 is defined by the projectible sleeve assembly, which is indicated generally by the numeral 230. That assembly comprises the inner sleeve 232 and the outer sleeve 234, rigidly connected together in coaxial radially spaced relation by the spider structure 235 which does not appreciably impede fluid flow between the sleeves. Outer sleeve 234 carries at its forward end the reentrant, generally conical nozzle structure 236, which is closely spaced from the forward end of inner sleeve 232, forming the nozzle throat 237 and the rearwardly and inwardly directed expanding nozzle passage 238. Throat 237 and passage 238 function in the general manner already described in connection with previous embodiments to produce suction flow in the passage 49. However, throat 237 remains open, flow through it being controlled by a valve somewhat further removed upstream than in the previous forms. The rearward end of outer sleeve 234 carries the annular piston structure 240.

The fixed housing and support structure 250 for guiding and controlling the movement of sleeve assembly 230 comprises the three tubes 244, 246 and 252, which are coaxially mounted in radially spaced relation by means of the rear support ring 251 and the forward end ring 253 to form inner and outer annular chambers.

The outer chamber 256 is supplied continuously with pressurized fluid, typically air, from a suitable source via the conduit 258, providing an immediately available supply of fluid similar to that of previously described header chamber 42. Sleeve assembly 230 is guided in its sliding movement by the inner fixed tube 244, which telescopically engages its inner sleeve 232, preferably within the latter, as shown. Piston structure 240 of the sleeve assembly slides freely within the fixed tube 246 with sealing means 241, sleeve 234 dividing the inner chamber of the fixed structure into the outer and inner piston chambers 260 and 270.

The forward end of outer piston chamber 260 is closed by the flange 247 carried by fixed tube 246, with sealing means 248 slidingly engaging the outer surface of sleeve 234. Outer piston chamber 260 is open continuously via the apertures 264 in tube 246 to pressure supply chamber 256, so that sleeve assembly 230 is continuously urged rearwardly toward the normal position shown in FIG. 9. That position may be defined in any desired manner, as by the apertured stop structure 261 abutting the annular bumper 262.

The present illustrative control valve structure for admitting fluid intermittently into piston chamber 270 comprises the sleeve valve 274 which slides axially in sealed relation in an annular aperture 254 in support ring 251. The forward end of the valve cooperates with the annular valve seat 276, mounted on the rearward end of tube 246. Valve 274 carries the piston formation 278 which works in the annular chamber 280, vented at its rearward end at 282. The forward end of chamber 280 is connected to the solenoid operated three-way pilot valve 284.

In idle condition of the system, as shown in FIG. 9, valve 284 connects chamber 280 to the atmosphere and valve 274 is closed by the spring 283. In response to an electrical pulse via the lines 285, typically derived from a photosensitive device in the manner previously described, pilot valve 284 is shifted to the position indicated in FIG. 10, admitting pressure from chamber 256 to the forward end of piston chamber 280 and opening the main control valve 274.

In operation of the system, intermittent opening of control valve 274 admits pressurized fluid from chamber 256 to the rearward portion of inner piston chamber 270. That pressure tends to drive sleeve assembly 230 forwardly in opposition to the yielding force developed continuously in piston chamber 260. The effective piston area presented by the sleeve assembly in inner chamber 270 corresponds to the entire radial spacing between fixed tube 246 and movable sleeve 232, exceeding the effective piston area in outer chamber 260 by a factor that is typically of the order of two, but may be selected over a wide range. Hence even a relatively low pressure in chamber 270 overcomes the full supply pressure in chamber 260 and projects the sleeve assembly forward to the working position shown in FIG. 10. That position is typically defined by contact of the bumper 272 with the rear face of flange 247. At the same time, the pressure in piston chamber 270 has direct access to nozzle orifice 237, producing a peripheral jet in passage 49, directed obliquely rearwardly and radially inwardly. That jet both produces suction flow in the passage and, by its reaction thrust, aids the outward motion of sleeve assembly 230.

So long as fluid is supplied at full supply pressure to chamber 270, the pressure drop due to the flow through nozzle orifice 237 maintains in piston chamber 270 essentially the full supply pressure, and, in any case, a sufficient pressure to overcome the effect of the smaller piston area in chamber 260. Hence sleeve assembly 230 is maintained in projected position, with full suction flow in passage 49. However, when the fluid supply is cut off by termination of the pilot valve pulse and closure of control valve 274, continuing fluid escape from the open nozzle orifice 237 soon reduces the pressure in chamber 270 to a value at which the full supply pressure in outer piston chamber 260 dominates, positively retracting the sleeve assembly to the normal position of FIG. 9. During that retraction the volume of piston chamber 270 is progressively reduced, driving additional fluid through the nozzle. An equilibrium rate of retraction tends to be rapidly established, such that the nozzle pressure drop maintains in chamber 270 a pressure just insufficient to balance the relatively high pressure and small piston area of chamber 260. With suitable design, that rate of nozzle flow during retraction of the sleeve assembly maintains a suction flow in passage 49 that is adequate to maintain effective, though reduced, picking action and to dispose of any plant product already in the passage. However, the reduced nozzle pressure during sleeve retraction avoids excessive power consumption such as might result from maintaining full pressurization of the nozzle throughout the picking cycle.

The projectible suction tube of FIGS. 9 and 10 is typically mounted with its forward end essentially flush with a wall, represented at 30a, corresponding generally to wall 30 of FIGS. 1 to 4. Operation of the suction tube may be controlled by light responsive means such as the photocell 100 of FIG. 3, for example, preferably employing a control circuit of the general type of FIG. 5 which automatically times the length of the picking cycle and inserts a rest period between successive cycles.

If it is preferred to control the several operational aspects of the picking cycle of a projectible suction tube independently of each other, the structure of FIGS. 9 and 10 may be modified as illustratively shown in FIG. 11. Outer sleeve 234 is extended at 234a rearwardly of piston structure 240, and that extension is slidingly engaged by a fixed rear flange 247a similar to forward flange 247. Such additional structure divides inner piston chamber 270 of the previous embodiment into an inner chamber 271 communicating between nozzle 237 and control valve 274, and an outer piston chamber 273 similar to outer piston chamber 260 of the previous form. Control valves of any desired type may be provided for supplying pressurized fluid alternatively to forward piston chamber 260 to retract the sleeve assembly and to the new rear piston chamber 273 to project that assembly. For example, three-way solenoid valves for that purpose are indicated at 290 and 292, and may be energized through normally open and normally closed switches of a relay which is typically energized by a control circuit similar to that for RL2 of FIG. 5 but having an independent time constant. The projection action of sleeve assembly 230 is then controllable independently of the primary pressurization of the injector nozzle 237, which remains under the control of valve 274.

If it is desired to maintain full injection pressure after starting retraction of the sleeve assembly, for example, the piston area in chamber 260 is made larger than the effective piston area of the sleeve assembly in chamber 271, and control valve 274 is operated by circuitry having a time constant that is longer than that for valves 290 and 292 by any desired amount.

If full injection pressure is to be maintained throughout retraction of the sleeve assembly and terminated upon its completion, the structure of FIG. 11 can be simplified. For example, valve 274 and the pilot valve that controls it can be entirely eliminated, the entire control function being performed by valves 290 and 292 or their equivalent. For that purpose the stop formation 261 at the rearward end of sleeve extension 234a may be considered to be solid so that it will act as a valve, and the bumper formation 261 on support ring 251 may be considered to represent a cooperating annular valve seat that is engaged by the valve upon full retraction of sleeve assembly 230. Pressurized fluid is then supplied to nozzle 237 by virtue of forward projection of the sleeve assembly, and is cut off by virtue of full retraction of the sleeve assembly to its normal or idle position.

I claim:
1. In a system for recovery of plant products and the like, the combination of:
   structure forming a passage having a receiving end and a delivery end, said passage structure being movable to bring the receiving end of the passage adjacent the location of such product,
   structure forming a fluid inlet that opens peripherally into the passage through a nozzle formation of generally annular form directed predominantly longitudinally of the passage toward its delivery end,
   valvular control means for the inlet comprising valve seat structure and a sleeve valve member surrounding the passage substantially coaxially and movable relative to the valve seat structure between a normal position closing the inlet closely adjacent the nozzle formation and an actuated position opening the inlet for fluid flow to the nozzle formation,
   means supplying pressurized fluid to the inlet, and
   means for selectively and intermittently shifting the sleeve valve member to actuated position to inject intermittent pulses of pressurized fluid through the nozzle formation into the passage to draw ambient fluid into the receiving end of the passage together with such plant product in the vicinity thereof.

2. The combination defined in claim 1, said passage including a portion adjacent its delivery end wherein the sectional area of the passage increases progressively toward its delivery end.

3. The combination defined in claim 1 and wherein said fluid supplying means comprise:
   structure forming a chamber having a volume at least of the same order of magnitude as the passage volume, and communicating freely with the entrance side of said valvular control means, and
   means for supplying pressurized gas to the chamber.

4. The combination defined in claim 3, and including also:
   means selectively responsive to presence of such product adjacent the receiving end of the passage,
   said valvular means being actuable under control of the selectively responsive means.

5. The combination defined in claim 3, and wherein:
   said shifting means include circuit means energizable to shift the sleeve valve member to actuated position for a predetermined limited time period, and
   means for energizing the circuit means in response to presence of such product adjacent the receiving end of the passage.

6. The combination defined in claim 1 and wherein:
   the last said means include circuit means energizable to shift the sleeve valve member to actuated position for a first predetermined limited time period in response to presence of such product adjacent the receiving end of the passage, and
   means acting to disable said circuit means for a second predetermined limited time period longer than said first time period in response to energization of said circuit means.

7. The combination defined in claim 1, and wherein said means for shifting the sleeve valve member comprise yielding means urging said member axially in one direction, structure enclosing a portion of said member in radially spaced relation to form a cylinder of annular section, outwardly extending flange structure on said member forming a piston slidable in the cylinder, pilot valve means for supplying pressurized fluid to the cylinder to move said member axially in the other direction against the force of said yielding means, and means for selectively operating the pilot valve means.

8. The combination defined in claim 1, and wherein:
   said sleeve valve member forms a section of the wall of said passage and is movable axially between said normal and actuated positions.

9. In a system for recovery of plant products and the like, the combination of:
- structure forming a passage having a receiving end and a delivery end, said passage structure being movable to bring the receiving end of the passage adjacent the location of such product,
- nozzle means having an inlet and having an outlet opening peripherally into the passage and directed predominantly toward the delivery end of the passage, said nozzle means including an intermediate throat region that has a sectional area smaller than the sectional area at the nozzle means outlet and that communicates with the nozzle means outlet through a smoothly tapering expansion region,
- means for supplying pressurized gas to the nozzle means inlet,
- valve means normally closing said nozzle means and actuable to permit gas flow through the nozzle means into the passage, and
- means for selectively actuating the valve means.

10. The combination defined in claim 9, and in which the walls of said smoothly tapering expansion region of the nozzle means diverge from each other at an angle between about 10 and about 15 degrees.

11. The combination defined in claim 9, and in which the sectional area of the nozzle at the outlet opening is at least about two and a half times larger than at the throat region.

12. The combination defined in claim 9, and wherein said gas supplying means comprise:
- structure forming a chamber communicating essentially directly with the inlet of the nozzle means, said chamber having a volume at least of the same order of magnitude as the passage volume, and
- means for supplying pressurized gas to the chamber.

13. In a system for recovery of plant products and the like, the combination of:
- a conveyance adapted to travel a path along the location of such products,
- a plant contacting wall mounted on the conveyance and having a plurality of mutually spaced product receiving apertures,
- structure forming a corresponding plurality of essentially straight passages extending inwardly from the respective apertures and opening at their inner ends to product receiving means,
- nozzle formations having inlets and having outlets opening into the respective passages in a longitudinally inward direction,
- chamber forming structure enclosing a chamber region for each passage, said chamber regions having volumes at least of the same order as the passage volumes and communicating essentially freely with the nozzle formation inlets of the passages,
- valves normally preventing flow between the inlets and outlets of the respective nozzle formations and actuatable to permit such flow,
- air compressing means,
- conduit means between the air compressing means and said chamber regions for normally maintaining therein pressurized air at a predetermined superatmospheric pressure, and
- control means for intermittently actuating the respective valves in response to presence of such product adjacent the associated wall aperture.

14. In a system for recovery of plant products and the like, the combination of:
- structure forming a passage having a receiving end and a delivery end, said passage structure being movable to bring the receiving end of the passage adjacent the location of such product,
- structure forming a chamber having a volume at least of the same order of magnitude as the passage volume,
- means for supplying pressurized gas to the chamber,
- structure forming a gas outlet from the chamber into the passage, said outlet opening into the passage through a nozzle formation directed predominantly longitudinally of the passage toward its delivery end,
- valve means normally closing the outlet and actuable intermittently to open the outlet, said outlet strucure and valve means providing substantially unrestricted gas flow from the chamber to the nozzle formatian during valve actuation, and
- means for selectively and intermittently actuating the valve means to inject intermittent pulses of pressurized gas from the chamber through the nozzle formation into the passage to draw ambient air into the receiving end of the passage together with such plant product in the vicinity thereof.

15. The combination defined in claim 14, and in which said means for actuating said valve means include:
- electrical means for actuating the valve means in response to an applied electrical pulse,
- means for supplying electrical pulses intermittently to the electrical means, and
- circuit means for limiting the duration of each electrical pulse to a predetermined time period.

16. In a system for recovery of plane products and the like, the combination of:
- a conveyance adapted to travel a path along the location of such products.
- a plant contacting wall mounted on the conveyance in position to slidingly engage plants adjacent its path,
- structure forming a plurality of passages opening inwardly through the wall in mutually spaced relation,
- means at the inner ends of the passages for receiving such products,
- means actuable selectively in response to presence of a plant product adjacent the outer end of a passage to produce a pulse of inward suction flow in that passage to draw into the passage ambient air and such product and to deliver the same to the reeciving means, and
- electrical timing means initiated in action under control of said pulse producing means and acting to disable the pulse producing means during a rest period of predetermined duration.

17. In a system for recovery of plant products and the like, the combination of:
- structure forming a passage having a receiving end and a delivery end, said passage structure being movable to bring the receiving end of the passage adjacent the location of such product,
- means including a valvular control actuable intermittently to produce inward suction flow into the receiving end of the passage,
- a sensor responsive to the presence of such plant product adjacent the receiving end of the passage in position to be drawn in by such suction flow,
- circuit means energizable under control of the sensor to actuate the valvular control for a first predetermined limited time period, and
- means acting in response to each circuit means energization to prevent re-energization of the circuit means during a second predetermined limited time period.

18. In a system for recovery of plant products and the like, the combination of:
- structure forming a product receiving main passage having a forward receiving end and a rearward delivery end, and being movable to bring the receiving end of the passage adjacent such product,
- said structure including valve means comprising a rearwardly facing generally annular valve seat surrounding the passage and a coaxial tubular valve member movable axially between a valve closing position with its forward end engaging the valve seat and a valve opening position with its forward end spaced from the valve seat, said structure including also tubular nozzle means extending in a generally rearward direction from the inner periphery of the valve seat and defining with the valve member a generally annular nozzle passage, the radially outer surface of the nozzle means having a forward portion that is parallel to the valve member and extends rearwardly of the forward end of the valve member in open position thereof, defining therewith a throat portion of the nozzle passage the transverse section of which is independent of said movement of the valve member, and the radially outer surface of the nozzle means having a rearward portion that is generally conical and defines with the valve member an expanding delivery portion of the nozzle passage that opens peripherally into the main passage, means for supplying pressurized gas to the radially outer side of said valve means, and means for selectively shifting the valve member between its said positions.

19. In a system for recovery of plant products and the like, the combination of:

a product receiving chamber, structure forming a passage having an outer, product receiving end and having an inner, product delivery end opening into the chamber, said passage having a length not exceeding about ten times the passage diameter adjacent the receiving end, said passage structure being movable to bring the receiving end of the passage adjacent the location of such product, means including nozzle structure for injecting pressurized gas into said passage adjacent its receiving end and directed toward its delivery end to produce inward fluid flow through said passage to draw in such products through its receiving end and deliver the same at its delivery end, said passage including a portion adjoining its delivery end wherein the sectional area of the passage increases continuously and at a progressively increasing rate toward its delivery end.

20. In a system for recovery of plant products and the like, the combination of:

a conveyance adapted to travel a path along the location of such products, a plant contacting wall mounted on the conveyance at an oblique angle with respect to travel thereof for laterally compressing plants in its path, said wall having a slick outer surface of hard material and being essentially free of fixed isolated lateral protuberances, said wall having a plurality of mutually spaced product receiving apertures opening inward from its outer surface, structure forming a corresponding plurality of passages extending inwardly from the wall with their outer product receiving ends in communication with the respective apertures, means for receiving products delivered from the other ends of the passages, said passages being essentially straight and continuously open for inward flow throughout their length, and means actuable selectively to inject pressurized fluid individually into the respective passages to produce inward flow therein and thereby to draw in ambient air together with any such product in the vicinity of the associated wall apertures.

21. The combination defined in claim 20, and wherein:

said product receiving means comprise structure forming a chamber into which a plurality of said passages open at their other ends, the passages opening into said chamber through mouths of progressively increasing cross-section.

22. The combination defined in claim 20, and including also structure forming a second wall mounted on the conveyance and adapted to press plants toward the first said wall, said combination including also nozzle structures mounted in the second wall and directed toward respective passage apertures in the other wall, and means for selectively projecting a fluid jet from each said nozzle in coordination with said actuation of the suction producing means for the passage toward which the nozzle is directed.

23. The combination defined in claim 20, and wherein:

said product receiving means comprise structure forming a common chamber into which a plurality of said passages open at their other ends, the width of said chamber along the axis of each passage being at least about equal to the length of the passage.

24. In a system for recovery of plant products and the like, the combination of:

a conveyance adapted to travel a path along the location of such products, a row of vertical column elements interconnected to form a rigid structure and having vertically elongated light transmitting panel elements extending between them and forming a smooth plant contacting wall mounted on the conveyance in position to slidingly engage plants adjacent its path, a plurality of structures mounted on each column element and forming respective passages opening inwardly through the wall in mutually spaced relation, means at the inner ends of the passages for receiving such products, means actuable selectively to produce inward suction flow in the respective passages to draw into the passages ambient air and any such products in the vicinity of the outer ends of the passages and to deliver the same to the receiving means, means mounted inward of the wall for producing light and for projecting the same through the light transmitting portions of the panels to the vicinity of the outer ends of the respective passages, light sensitive means mounted inward of the wall and optically beamed through the panels to receive light from regions adjacent the outer ends of the respective passages, the light sensitive means being selectively responsive to light reflected by such products, and means for actuating the suction producing means for each passage under control of the associated light sensitive means.

25. The combination defined in claim 24, and wherein said light producing means are fluorescent lamps mounted inward of the respective wall panels and optically beamed through the wall panels toward regions adjacent the outer ends of the respective passages.

26. In a system for recovery of plant products and the like, the combination of:

structure forming a passage having an axis and a forwardly facing receiving end, structure forming a nozzle mounted substantially on the passage axis in axially spaced relation forward of, and directed toward, the receiving end of the passage, said passage structure and nozzle structure being bodily movable with respect to such product to position the product between the nozzle and the receiving end of the passage, and means actuable in definite timed relationship to produce rearward suction flow in the passage and also to project a jet of fluid from the nozzle toward the receiving end of the passage to move said product into and through the passage.

27. The combination defined in claim 26, and wherein:
the last said means are actuable in response to presence of said product in a region between the nozzle and the receiving end of the passage.

28. In a system for recovery of plant products and the like, the combination of:
a conveyance adapted to travel a path along the location of such products,
a plurality of column structures each comprising mutually spaced parallel front and back wall sections and structure forming with said wall sections an elongated chamber adapted to contain pressurized fluid,
means mounting the column structures generally vertically in parallel spaced relation on the conveyance with their front wall sections essentially in a surface that is oblique with respect to the conveyance travel,
window structures comprising light transmitting material and extending between the front wall sections of adjacent column structures and forming therewith a smooth plant contacting wall lying in said oblique surface,
the wall sections of each column having a plurality of longitudinally spaced sets of bores that are mutually alined on respective axes essentially perpendicular to said oblique surface,
passage forming structures mounted coaxially in the respective sets of bores in sealed relationship with the chamber wall sections and forming respective passages with inlet mouths at their forward ends opening inwardly through the plant contacting wall and with outlet mouths at their rearward ends,
said passage forming structures including respective valved nozzle means actuable to admit pressurized fluid from said elongated chambers through the passage wall into the passage in a generally rearward direction,
illuminant means mounted behind the respective window structures for illuminating objects forward of the plant contacting wall,
light sensitive means for receiving light from regions forward of the plant contacting wall and adjacent the respective passage inlet mouths, the light sensitive means being selectively responsive to light reflected by such products, and
means for selectively actuating said valved means of each passage structure under control of the associated light sensitive means.

29. In a system for recovery of plant products and the like, the combination of:
a conveyance adapted to travel a path along the location of such products,
a suction tube with an outer open product receiving end mounted on such conveyance and projectible outwardly along a line of projection transverse of the path of travel of the conveyance,
the suction tube including nozzle means opening into the tube adjacent its receiving end and directed predominantly longitudinally thereof away from the receiving end,
means for projecting the tube intermittently, and
means actuable to inject pressurized fluid through the nozzle means into the tube to draw ambient fluid into the receiving end of the tube together with such plant product in the vicinity thereof.

30. The combination defined in claim 29, and in which said tube projecting means are actuable to project said suction tube independently of the actuation of said fluid injecting means.

31. The combination defined in claim 29, and in which said tube projecting means include
piston means associated with said suction tube and acting to project the suction tube in response to actuation of said fluid injecting means.

32. The combination defined in claim 29, and wherein:
said fluid injecting means comprise valve means for controlling fluid flow to said nozzle means, and
means coupling the valve means to the suction tube for operation by virtue of the projection thereof.

33. In a system for recovery of plant products and the like, the combination of:
housing structure having an apertured wall,
a tube assembly comprising coaxial inner and outer radially spaced tubes defining an annular chamber, and nozzle means adjacent the forward end of the tube assembly having an inlet from said chamber and an outlet to the interior of the inner tube directed generally rearwardly thereof, said tube assembly being mounted in the housing structure for axial translational movement to reversably project its forward end portion through the wall aperture,
means for selectively driving the tube assembly in its said movement in response to presence of such product forward of the housing wall and adjacent the wall aperture, and
means actuable to supply pressurized fluid to said annular chamber during at least a portion of such movement.

References Cited

UNITED STATES PATENTS

| | | | |
|---|---|---|---|
| 1,107,083 | 8/1914 | Lovejoy | 56—30 |
| 1,400,522 | 12/1921 | Cannon | 56—30 |
| 2,088,676 | 8/1937 | White | 56—14 |
| 2,140,399 | 12/1938 | Connolly | 56—28 |
| 2,615,668 | 10/1952 | Ernest | 251—5 |
| 2,653,438 | 9/1953 | Ramirez | 56—32 |
| 2,688,835 | 9/1954 | Rawson | 56—32 |
| 2,740,153 | 4/1956 | Bishop | 56—32 XR |
| 2,741,888 | 4/1956 | Hamel et al. | 56—12 |
| 2,763,978 | 9/1956 | Graham et al. | 56—30 |

RUSSELL R. KINSEY, Primary Examiner

PO-1050
(5/69)

UNITED STATES PATENT OFFICE
CERTIFICATE OF CORRECTION

Patent No. 3,486,315        Dated December 30, 1969

Inventor(s) William W. Boynton

It is certified that error appears in the above-identified patent and that said Letters Patent are hereby corrected as shown below:

Col. 17, line 32, after "means" and before the commas, insert
--at least during valve means actuation--

SIGNED AND
SEALED
OCT 6 - 1970

(SEAL)
Attest:

Edward M. Fletcher, Jr.
Attesting Officer

WILLIAM E. SCHUYLER, JR.
Commissioner of Patents